US005586504A

United States Patent [19]
He et al.

[11] Patent Number: 5,586,504
[45] Date of Patent: Dec. 24, 1996

[54] DUAL-KEEL ELECTRODYNAMIC MAGLEV SYSTEM

[75] Inventors: Jianliang He, Naperville; Zian Wang, Downers Grove; Donald M. Rote, Lagrange; Howard T. Coffey, Darien; John R. Hull, Westmont; Thomas M. Mulcahy, Western Springs; Yigang Cai, Woodridge, all of Ill.

[73] Assignee: The United States of America as represented by The United States Department of Energy, Washington, D.C.

[21] Appl. No.: 438,829

[22] Filed: May 11, 1995

[51] Int. Cl.$^6$ .................................................. B60L 13/04
[52] U.S. Cl. .......................... 104/282; 104/286; 104/292
[58] Field of Search .................................. 104/281, 282, 104/284, 285, 286, 292

[56] References Cited

U.S. PATENT DOCUMENTS

| | | | |
|---|---|---|---|
| 3,470,828 | 10/1969 | Powell et al. | 104/282 |
| 3,858,522 | 1/1975 | Maki | 104/282 |
| 3,867,886 | 2/1975 | Maki | 104/282 |
| 3,924,537 | 12/1975 | Matsui et al. | 104/282 |
| 4,913,059 | 4/1990 | Fujie et al. | 104/282 |
| 5,222,436 | 6/1993 | Coffey | 104/281 |
| 5,253,591 | 10/1993 | Rote et al. | 104/281 |
| 5,270,593 | 12/1993 | Levi et al. | 104/282 X |
| 5,275,112 | 1/1994 | Rote et al. | 104/282 |
| 5,293,824 | 3/1994 | Fujie et al. | 104/282 |

OTHER PUBLICATIONS

He, J. L. et. al., The International Conference on Speedup Technology for Railway and Maglev Vehicles dtd Nov. 22–26, 1993 vol. 1—Performance Analysis of the Combined EDS Maglev Propulsion, Levitation, and Guidance System, The Japan Society of Mechanical Engineers (7 pgs).

He, J. L., et. al, Study of Japanese Electrodynamic–Suspension Maglev Systems, United States Department of Energy, Center for Transportation Research Argonne National Laboratory (Apr. 94) (75 pgs).

Fujiwara, S., et al., Characteristics of the Combined Levitation and Guidance System Using Ground Coils of the Side Wall of the Guideway, International Conf (Jul. 89) 3 pgs.

Coffey, H. T., et. al., Preliminary Design for a Maglev Development Facility, Center for Transporation Research Argonne National Laboratory (Draft Rpt) (pp. 1–1 to 3–5, 6–1 to 6–11, and 7–1 to 8–11).

Primary Examiner—Robert Oberleitner
Assistant Examiner—Kevin D. Rutherford
Attorney, Agent, or Firm—Bradley W. Smith; Hugh Glenn; William R. Moser

[57] ABSTRACT

A propulsion and stabilization system with a plurality of superconducting magnetic devices affixed to the dual-keels of a vehicle, where the superconducting magnetic devices produce a magnetic field when energized. The system also includes a plurality of figure-eight shaped null-flux coils affixed to opposing vertical sides of slots in a guideway. The figure-eight shaped null-flux coils are vertically oriented, laterally cross-connected in parallel, longitudinally connected in series, and continue the length of the vertical slots providing levitation and guidance force. An external power source energizes the figure-eight shaped null-flux coils to create a magnetic traveling wave that interacts with the magnetic field produced by the superconducting magnets to impart motion to the vehicle.

7 Claims, 6 Drawing Sheets

DUAL-KEEL ELECTRODYNAMIC MAGLEV SYSTEM

The United States Government has rights in this invention pursuant to Contract No. W31-109-ENG-38 between the U.S. Department of Energy and the University of Chicago.

BACKGROUND OF THE INVENTION

This invention relates to a propulsion and stabilization system for an inductive repulsive type, magnetically levitated vehicle, and more specifically, to a magnetically levitated ("maglev") vehicle which is levitated and guided by figure eight-shaped null-flux coils.

Maglev development began more than two decades ago in the United States, Germany, Japan, Canada and England. In the United States, renewed interest has been directed toward magnetic levitation transportation systems in view of such factors as energy conservation, high speed transportation at ground level, economic and environmental problems associated with conventional systems and competition from Germany and Japan.

The use of electrodynamic levitation in maglev systems is well known in the prior art (see U.S. Pat. No. 3,470,828, issued Oct. 7, 1969, to Powell et al.). A number of methods of using magnetic forces to suspend, guide, and propel vehicles have been described in the literature, of which there are two basic suspension concepts: one, called Electromagnetic System ("EMS"), utilizes the attractive force between controlled d.c. electromagnets and ferromagnetic rails, while the other, called the Electrodynamic System ("EDS"), utilizes the repulsive force between eddy currents induced in non-ferromagnetic metal conductors and superconducting magnets ("SCM's"). Generally, the SCM's are mounted on the lower part of the vehicle, while the iron rails or non-ferromagnetic metal conductors are mounted on a fixed guideway.

A special suspension concept based on EDS is called "null flux" suspension. It was invented by J. Powell and G. Danby in the late sixties and patented in 1969, see U.S. Pat. No. 3,470,828 referenced above. The concept was invented as a way to reduce the electromagnetic drag force that is inherent in any suspension system that relies on eddy currents in the conductors. The concept also results in a stiffer suspension system than non-null-flux approaches. The heart of the null-flux system is a series of shorted "FIG.-8" coils that may be vertically oriented on the guideway or folded over so that the upper and lower loops are parallel to each other.

When an energized coil, like a SCM, passes midway between the loops, no net current is induced in the loops because they are cross connected or counter wound, hence the term "null-flux". When the SCM is displaced from the midplane or neutral position relative to the upper and lower loops, a large net current is induced in the loops and a strong repulsive force acts to restore the SCM to the neutral or null-flux position.

In 1967–8 the feasibility of using Powell and Danby's concept for the suspension and guidance of a Mach 10 rocket sled was evaluated. At that time, continuous sheets of aluminum in place of guideway coils was proposed, a concept that was extended to high-speed ground transportation systems by Howard Coffey and Frank Chilton. In 1970 H. H Kolm and R. D. Thorton conceived a novel form of maglev in which saddle-shaped SCM's were placed along the bottom of the vehicle. This system provided levitation, guidance and propulsion.

J. K. Dukowicz, L. O. Hoppie and T. C. Wang developed a system that combined levitation, propulsion and guidance of a vehicle over a guideway consisting of metallic loops, which did not require three-phase excitation.

The most sustained efforts in developing the EDS system have been made in Japan. A series of test and developmental vehicles have been constructed under the sponsorship of Japanese National Railroads and later the Railway Technical Research Institute. The EDS system in Japan uses SCM's on the vehicle, which reacts against conducting coils in the guideway to achieve levitation, guidance and propulsion. The SCM's are located vertically, reacting with the figure-eight shaped null-flux coils on the guideway for levitation and guidance.

The development of the EMS systems can be traced back to 1969, when Krauss-Maffei (KM) and Messerschmitt-Boelkow-Blohm (MBB) began development of two systems. KM's system used separate levitation and guidance systems, while KM used a combined levitation/guidance system. In the United States, research on EMS systems began in 1970 when both top-suspended and bottom-suspended systems were constructed.

Some maglev design concepts utilize the same vehicle magnets to perform more than one of the basic functions of suspension, guidance or propulsion, as provided above. The updated Japanese EDS maglev system uses a combined propulsion and null-flux suspension concept in which two rows of figure-eight-shaped null-flux coils mounted on the side walls of the box-shaped guideway are cross connected. This arrangement requires only one set of guideway coils to perform three functions. An analysis of the Japanese system is set forth in the applicants' recently published *Performance Analysis of the Combined EDS Maglev Propulsion, Levitation, and Guidance System*, The International Conference on Speedup Technology for Railway and Maglev Vehicles, (November 1993) and *Study of Japanese Electrodynamic Suspension Maglev System*, Center for Transportation Research, Argonne National Laboratory (April 1994).

In the invention described herein, the SCM's coupled to the vehicle's dual keels interact with two mirror image rows of null-flux coils mounted to the vertical walls of the guideway slots to produce a form of null-flux suspension, lateral guidance, and, when the coils are cross-connected and energized by an external multi-phase power source, propulsion.

SUMMARY OF THE INVENTION

It is an object of the present invention to improve overall system efficiency by utilizing both sides, or poles, of the SCM's.

It is a further object of this invention to improve vehicle stability by utilizing a dual-keel arrangement.

It is another object of this invention to reduce the longer wiring required to connect the figure-eight shaped null-flux coils mounted on the two side walls.

It is yet another object of this invention to reduce power usage and alleviate magnetic field shielding problems in the passenger compartment.

Additional advantages, objects and novel features of the invention will become apparent to those skilled in the art upon examination of the following and by practice of the invention.

To achieve the foregoing and other advantages, this invention comprises a pair of vertical keels axially aligned along the lower portion of the maglev vehicle and a guideway having a pair of vertical slots longitudinally aligned to receive the vertical keels.

In addition, this invention includes a propulsion and stabilization system with a plurality of superconducting magnetic devices affixed to the vertical keels, where the superconducting magnetic devices produce a magnetic field when energized. The system also includes a plurality of figure-eight shaped null-flux coils affixed to opposing vertical sides of the slots in the guideway. The figure-eight shaped null-flux coils are vertically oriented, laterally cross-connected in parallel, longitudinally connected in series, and continue the length of the vertical slots. The figure-eight shaped null-flux coils provides levitation and guidance forces, and, when an external power source energizes the figure-eight shaped null-flux coils, provides propulsion force by creating a magnetic traveling wave that interacts with the magnetic field produced by the SCM's and imparts motion to the vehicle.

BRIEF DESCRIPTION OF THE DRAWINGS

The present invention is illustrated in the accompanying drawings where.

DETAILED DESCRIPTION OF THE INVENTION

Figure 1:
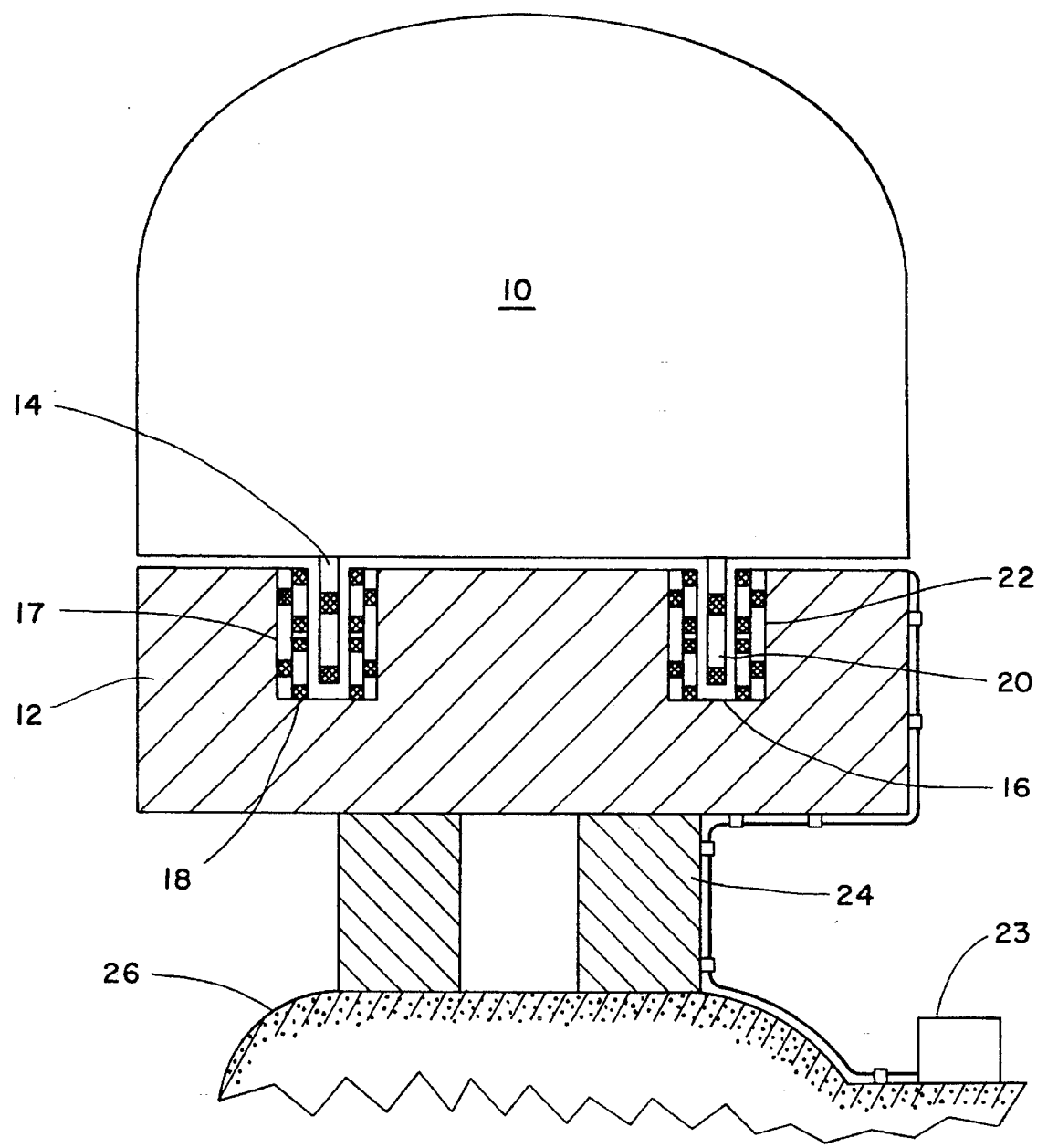
FIG. 1 is a schematic cross-section of a maglev vehicle and its electrodynamic leviation and propulsion systems, depicting the separate propulsion coils, with pillars and roadbed.

In the schematic cross-section of the present invention depicted in FIG. 1, vehicle 10 and its undercarriage, comprised of a pair of vertical keels 14 having a plurality of SCM's 20 attached thereto, are levitated and propelled by electromagnetic system included in guideway 12, which is affixed to roadbed 26. Guideway 12 may be anchored directly to roadbed 26 or anchored by means of pillars 24. Guideway 12 and pillars 24 may be constructed of concrete or similar material and may include means for elevation, to avoid grade crossings as well as for safety and other reasons.

In addition, guideway 12 has a pair of vertical slots 16, said slots 16 having vertical sides 17, running the length of the guideway 12 that are aligned to receive keels 14.

The electrodynamic system is comprised of a plurality of figure eight-shaped null-flux coils 18 and propulsion coils 22 attached to opposing vertical sides of slots 16 in guideway 12, as shown in FIGS. 1. Propulsion coils 22 of the electromagnetic system is powered by external, multi-phase power source 32 which is distinct from guideway 12 and roadbed 26 as shown in FIG. 1. Null-flux coils 18 are vertically oriented and continue the length of slots 16 and are connected in parallel by means of lateral cross-connections 28 shown in FIGS. 2 and 3. In addition, propulsion coils 22 are attached to null-flux coils 18 and run the length of slots 16.

Figure 2:
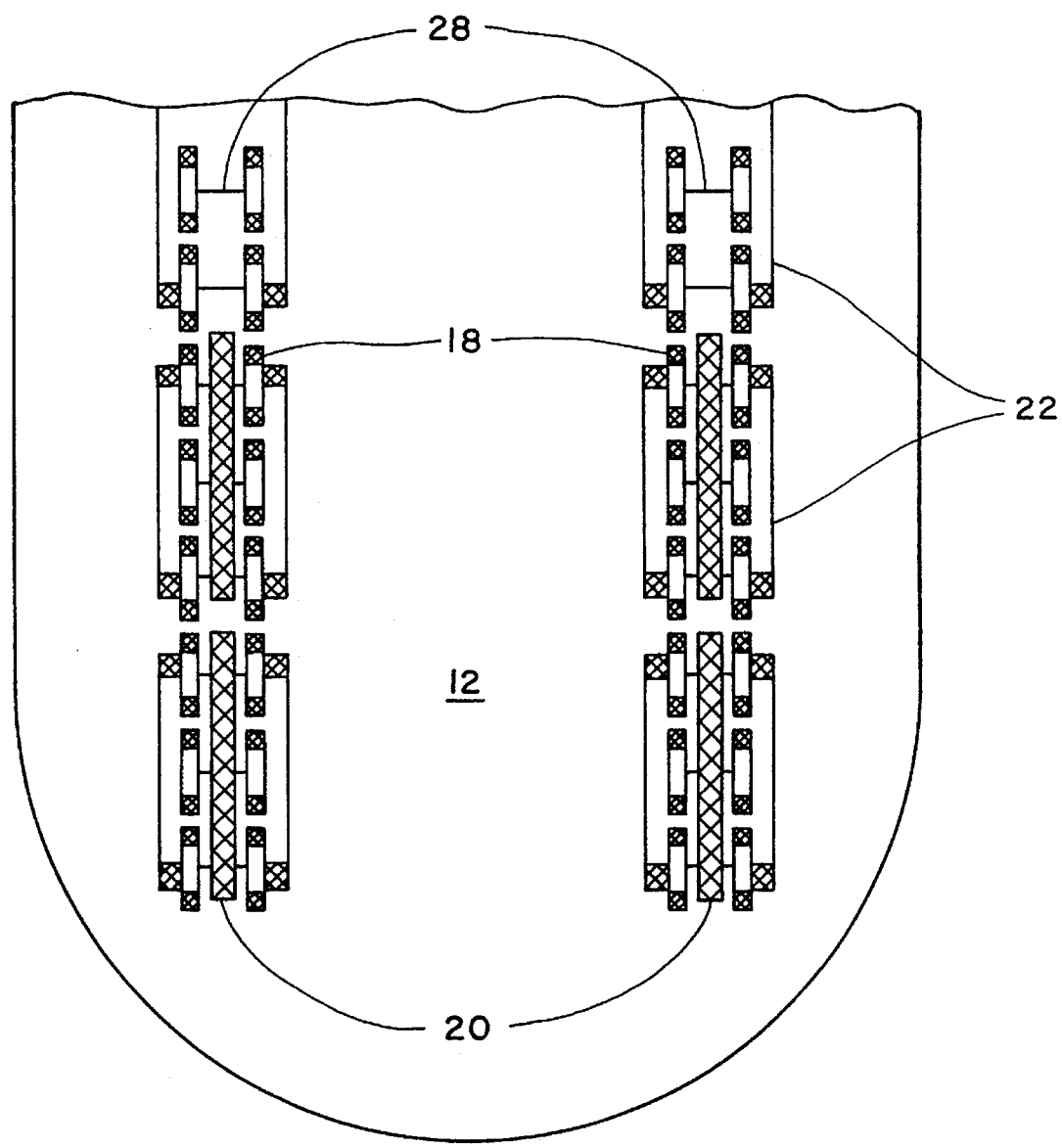
FIG. 2 is a schematic perspective view of the maglev vehicle of FIG. 1 showing the relative positions of the figure-eight shaped null-flux coils and propulsion coils and the SCM's of the present invention.
Figure 3:
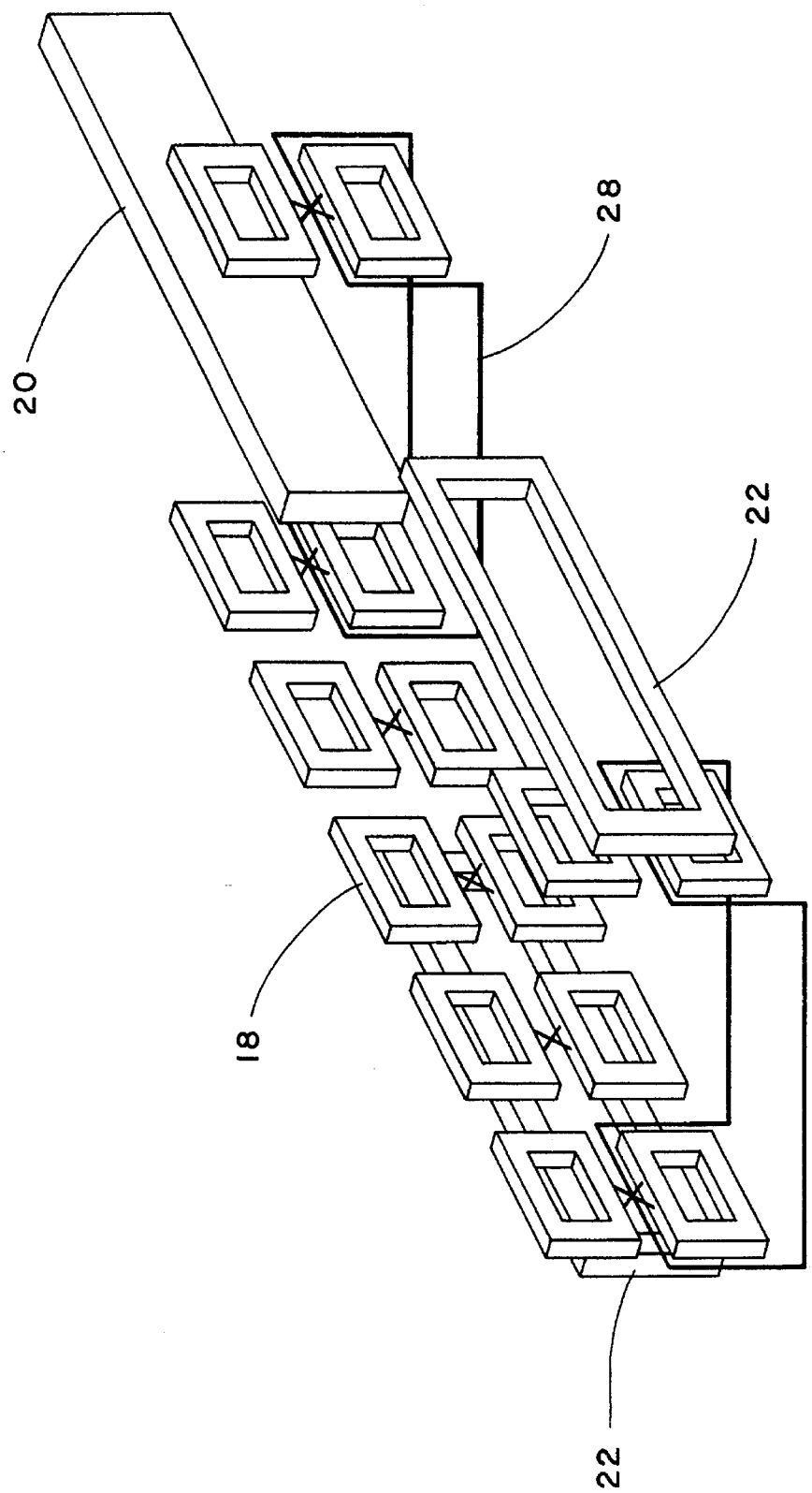
FIG. 3 is a schematic perspective view of the maglev vehicle of FIG. 1 showing the relative positions of the figure-eight shaped null-flux coils to the SCM's of the present invention.

The relative positions of SCM's 20, null-flux coils 18, propulsion coils 22 and lateral cross-connections 28 are depicted in the schematic perspective view of FIG. 2. A plurality of SCM's 20 are affixed to keels 14 and are parallel to the vertical walls of slots 16, as shown in FIG. 1. Similarly, FIG. 3 depicts the relative position of the SCM's 20 to figure-eight shaped null-flux coils 18, showing one of the two mirror image structures on either vertical wall of slots 16. FIG. 3 also shows, in greater detail, lateral cross-connections 28.

SCM's 20 are comprised of current-carrying super-conducting coils enclosed in Dewar structures (not shown) maintained at cryogenic temperatures using appropriate refrigeration equipment (not shown) and produce a magnetic field. In the alternative, SCM's 20 comprise permanent magnets.

Vehicle 10 is placed in motion when propulsion coils 22 are energized by external power source 32 producing a traveling magnetic wave. The interaction between the magnetic field of SCM's 20 and propulsion coils 22 produces a propulsion force, moving vehicle 10 in the direction of the traveling wave. Simultaneously, when vehicle 10 is in motion, a repulsive force is generated between SCM's 20 and guideway 12 by the interaction of SCM's 20 and the eddy currents induced in figure-eight shaped null-flux coils 18. This repulsive force levitates SCM's 20 and keels 14 to maintain the vertical position of vehicle 10. Because figure-eight shaped null-flux coils 18 are affixed to opposing vertical walls of slots 16, the repulsive forces also serve to guide vehicle 10 laterally as well; thus the electromagnetic interaction of SCM's 20 and null-flux coils 18 position vehicle 10 both laterally and vertically.

Figure 4:
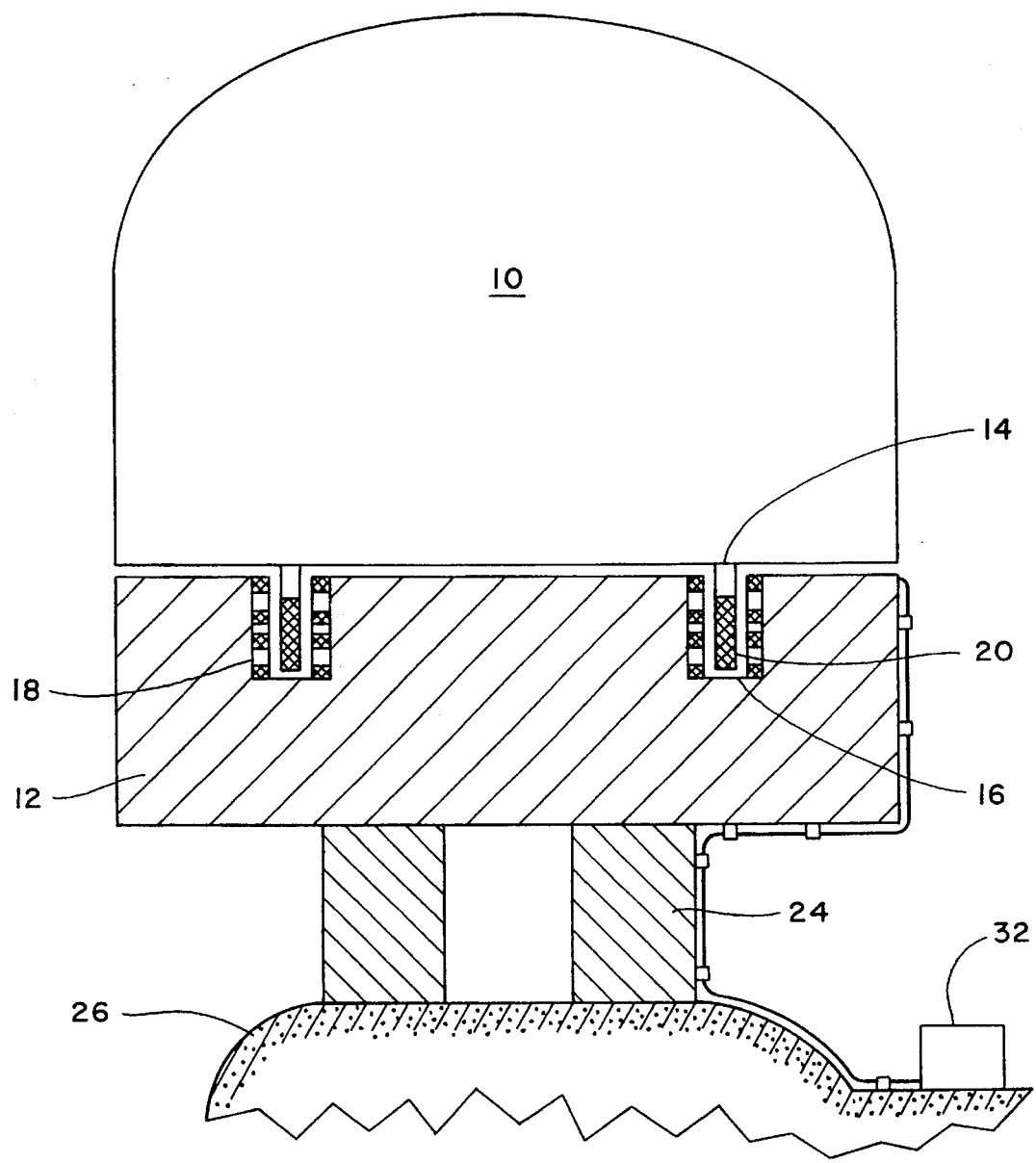
FIG. 4 is a schematic cross-section of a variation to the maglev vehicle and its electrodynamic leviation and propulsion systems, without separate propulsion coils, with pillars and roadbed.

In one other variation of the present invention depicted in FIG. 4, vehicle 10 and its undercarriage comprised of a pair of vertical keels 14 having a plurality of SCM's 20 attached thereto, are levitated and propelled by electromagnetic system included in guideway 12 which is affixed to roadbed 26. Guideway 12 may be anchored directly to roadbed 26 or anchored by means of pillars 24. Guideway 12 and pillars 24 may be constructed of concrete or similar material and may include means for elevation, to avoid grade crossings as well as for safety and other reasons. In addition, guideway 12 has a pair of vertical slots 16, said slots 16 having vertical sides, running the length of the guideway 12 that are aligned to receive keels 14.

Figure 5:
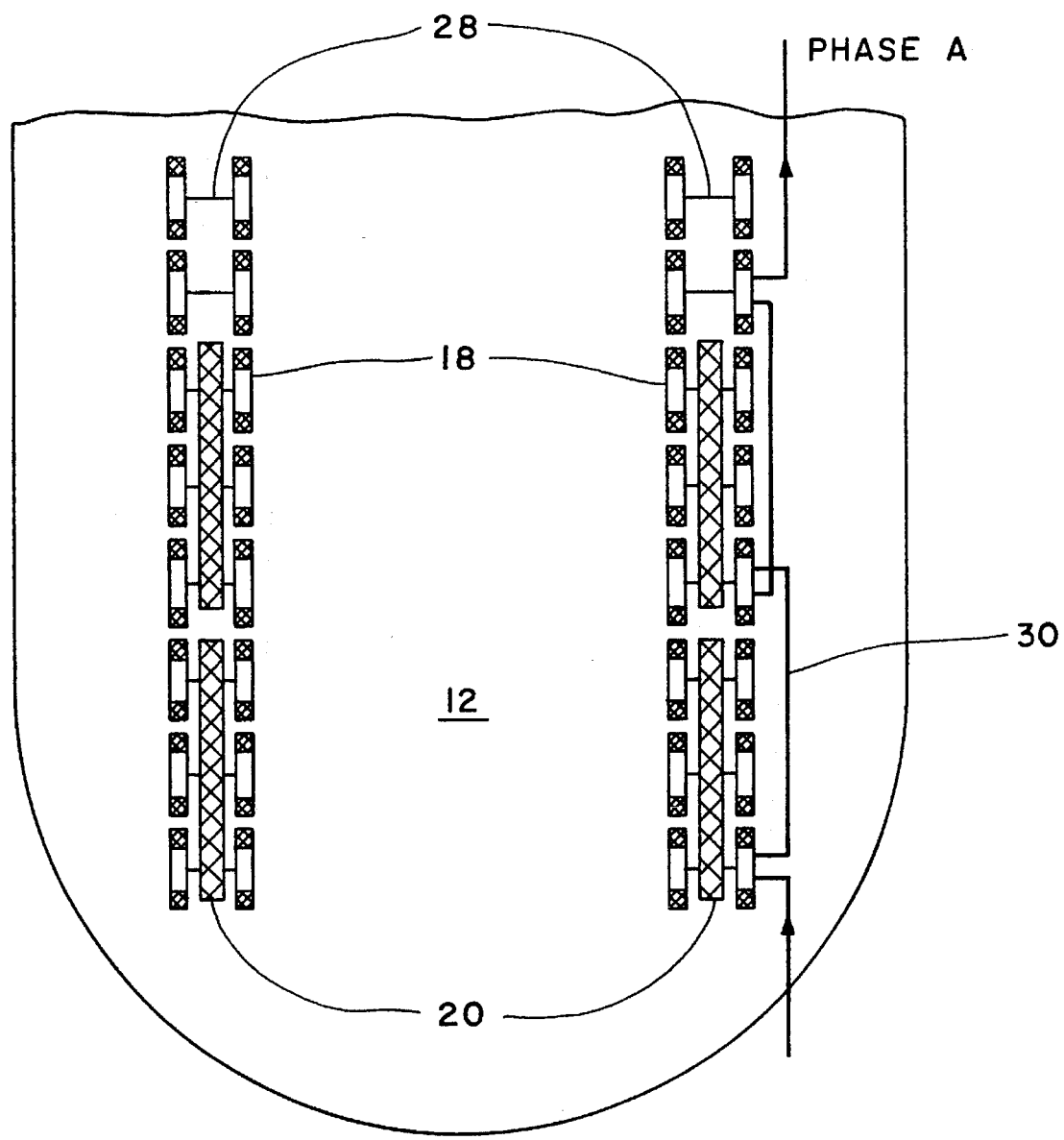
FIG. 5 is a schematic perspective view of the maglev vehicle of FIG. 4 depicting the relative positions of the figure-eight shaped null-flux coils, the SCM's and the connections of the figure-eight shaped null-flux coils, connected to combine propulsion, levitation and guidance.

Null-flux coils 18 are connected to external, multi-phase power source 32 which is distinct from guideway 12 and roadbed 26 as shown in FIG. 4. The electrodynamic system is comprised of a plurality of figure eight-shaped null-flux coils 18 attached to opposing vertical sides of slots 16 in guideway 12, as shown in FIGS. 4. Null-flux coils 18 are vertically oriented and continue the length of slots 16 and are connected in parallel by means of lateral cross-connections 28 and in series by means of longitudinal propulsion connections 30 shown in FIGS. 5 and 6.

Figure 6:
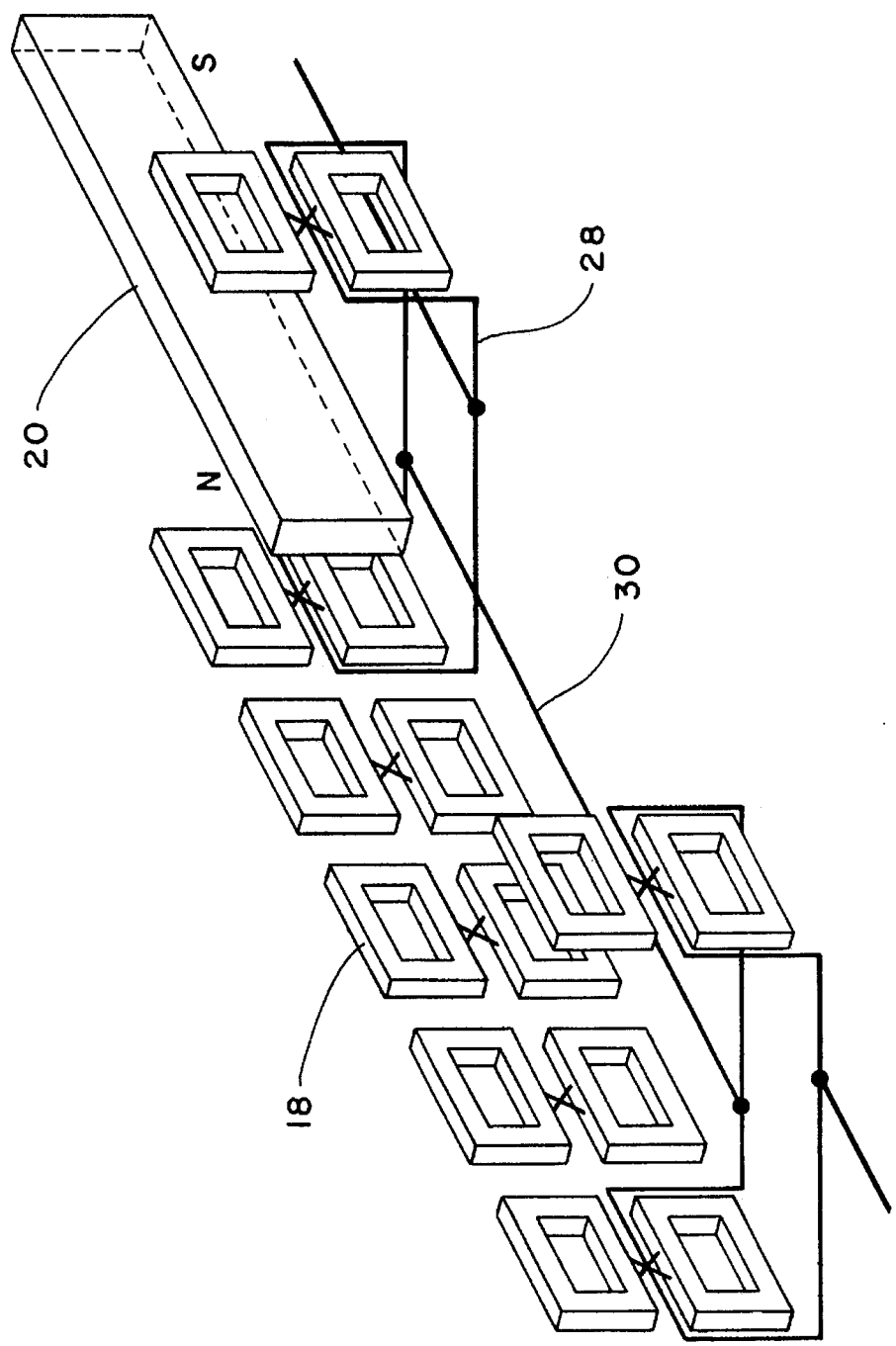
FIG. 6 is a schematic perspective view of the maglev vehicle of FIG. 4 showing the connections of the figure-eight shaped null-flux coils and the relative positions of the figure-eight shaped null-flux coils to the SCM's of the present invention.

The relative positions of SCM's 20, null-flux coils 18, lateral cross-connections 28 and longitudinal propulsion connections 30 are depicted in the schematic perspective view of FIG. 6. A plurality of SCM's 20 are affixed to keels 14 and are parallel to the vertical walls of slots 16, as shown in FIG. 4. Similarly, FIG. 6 depicts the relative position of the SCM's 20 to null-flux coils 18, showing one of the two mirror image structures on either vertical wall of slots 16. FIG. 6 also shows, in greater detail, lateral cross-connections 28 and longitudinal propulsion cross-connections 30.

Vehicle 10 is placed in motion when null-flux coils 18 are energized by external power source 32 producing a traveling magnetic wave. The interaction between the magnetic field of SCM's 20 and null-flux coils 18 produces a propulsion force, moving vehicle 10 in the direction of the traveling wave. Simultaneously, when vehicle 10 is in motion, a repulsive force is generated between SCM's 20 and guideway 12 by the interaction of SCM's 20 and the eddy currents induced in null-flux coils 18. This repulsive force levitates SCM's 20 and keels 14 to maintain the vertical position of vehicle 10. Because null-flux coils 18 are affixed to opposing vertical wall of slots 16, the repulsive forces also serve to guide vehicle 10 laterally as well; thus the electromagnetic interaction of SCM's 20 and null-flux coils 18 position vehicle 10 both laterally and vertically.

As set forth above, the dual-keel configuration, in either embodiment, is inherently more stable than previous vehicles. If vehicle 10 suffers a lateral shift, i.e., due to a gust of wind, passenger movement, etc., vehicle 10 may move to either side of guideway 12. Correspondingly keels 14 will move in the same direction, i.e., towards the one shift side of vehicle 10. The gap between keels 14 and the vertical walls of slots 16 will decrease on one side of keels 14 and increase on the other side. Said decrease in the gap will cause the guidance force between SCM's 20 and null-flux coils 18 on that side of keels 14 to increase and the corresponding guidance force on the other side of keels 14 to decrease. The net effect will be to push keels 14, and thus vehicle 10, back towards the center of slots 16, and guideway 12. Similarly, if one side of vehicle 10 suffers a vertical shift causing that side to rise in guideway 12, the corresponding keel 14 will rise in slot 16 (rising keel 14), resulting in an increase in the gap between rising keel 14 and the corresponding null-flux coils 18. Said rise on one side of vehicle 10 will cause the vehicle to become unbalanced, causing the other side of the vehicle (dipping side) to dip. This causes the gap between keel 14 (dipping keel 14) and slot 16 on the dipping side of vehicle 10 to decrease. Said decrease in the gap will cause the lift force between SCM's 20 and null-flux coils 18 on the dipping side of vehicle 10 to increase, causing the dipping keel 14 to rise. The net effect will be to cause vehicle 10 to level out, resulting in a more stable system.

The embodiment of this invention in which an exclusive property or privilege is claimed is defined as follows:

1. A magnetic levitation, guidance and propulsion system for a vehicle having a base and adapted to travel over a roadbed comprising:

a pair of vertical keels axially aligned along the base of said vehicle;

a row of superconducting magnets integrally connected to and arranged lengthwise along each of said keels and oriented so that said magnets' poles are approximately perpendicular to a vertical plane formed by said keel;

a guideway affixed along said roadbed, said guideway having a pair of vertical slots longitudinally aligned to receive said vertical keels;

electromagnetic means affixed to opposing vertical sides of said vertical slots for interacting with said row of superconducting magnets to levitate, guide and propel said vehicle where both poles or double-sides of said superconducting magnets electromagnetically interact with said electromagnetic means when said means is activated to form two double-sided linear synchronous motors for propulsion.

2. The magnetic levitation and propulsion system of claim 1 wherein the electromagnetic means comprises a plurality of figure-eight shaped null-flux coils affixed to opposing vertical sides of said vertical slots where said coils are cross-connected to couple opposing null-flux coils, within each slot, in a parallel configuration, thus, providing levitation and guidance when said vehicle is in operation.

3. The magnetic levitation and propulsion system of claim 2 wherein the electromagnetic means comprises longitudinally connecting said figure-eight shaped full-flux coils in series and in a multiphase configuration to provide propulsion to the vehicle when energized by a multiphase external power source which creates a magnetic traveling wave that interacts with both poles of said magnetic field produced by said superconducting magnets.

4. The magnetic leviation and propulsion system of claim 3 wherein said figure-eight shaped null-flux coils are vertically oriented and continue the length of said vertical slots, providing guidance and levitation forces, and, when energized, creating a magnetic traveling wave, wherein said magnetic traveling wave interacts with said magnetic field and imparts motion to the vehicle.

5. The magnetic levitation system of claim 2 wherein said electromagnetic means further comprises a plurality of propulsion coils affixed to said figure-eight shaped null-flux coils, wherein said propulsion coils are energized by a multiphase power source to create a magnetic traveling wave that interacts with both poles of said magnetic field of said superconducting magnets and imparts motion to the vehicle.

6. A magnetic levitation and propulsion system for a vehicle having a base adapted to travel over a roadbed comprising:

a pair of vertical keels axially aligned along the base of said vehicle;

a linear row of superconducting magnets integrated into said vertical keels and oriented in such a manner that a plurality of poles associated with said row of magnets forms a plane approximately perpendicular to said vertical keels;

a guideway affixed along said roadbed where said guideway has a pair of vertical slots longitudinally aligned to receive said pair of vertical keels;

a plurality of figure-eight shaped null-flux coils affixed to opposing verticaly sides of said vertical slots, wherein said figure-eight coils are vertically oriented and laterally cross-connected, within each slot, in parallel, and continue the length of said vertical slots;

a plurality of propulsion coils affixed to said figure-eight shaped null-flux coils that are energized by an external multiphase power source to create a magnetic traveling wave that interacts with said magnetic field generated by both sides of said superconducting magnets which comprise said row of magnets and imparts motion to the vehicle.

7. A magnetic levitation and propulsion system for a vehicle having a base adapted to travel over a roadbed comprising:

a pair of vertical keels axially aligned along the base of said vehicle;

a linear row of superconducting magnets integrated into said vertical keels and oriented in such a manner that a plurality of holes associated with said row of magnets forms a plane approximately perpendicular to said vertical keels:

a guideway affixed along said roadbed where said guideway has a pair of vertical slots longitudinally aligned to receive said pair of vertical keels;

a plurality of figure-eight shaped null-flux coils affixed to opposing vertical sides of said vertical slots, wherein said figure-eight coils are vertically oriented, laterally cross-connected, within each slot, in parallel, longitudinally connected in series, and continue the length of said vertical slots;

an external multiphase power source that energizes the figure-eight shaped null-flux coils to create a magnetic traveling wave that interacts with said magnetic field generated by both sides of said superconducting magnets which comprise said row of magnet to impart motion to the vehicle.

* * * * *